(12) United States Patent
Lee et al.

(10) Patent No.: US 6,975,490 B2
(45) Date of Patent: Dec. 13, 2005

(54) APPARATUS AND METHOD FOR DETECTING PHASE STATE

(75) Inventors: Byeong-Hoon Lee, Gyeonggi-Do (KR); Min-Ho So, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 10/429,829

(22) Filed: May 6, 2003

(65) Prior Publication Data

US 2004/0075471 A1    Apr. 22, 2004

(30) Foreign Application Priority Data

Oct. 17, 2002  (KR)  ........................ 10-2002-0063553

(51) Int. Cl.[7] .............................................. H02H 7/00
(52) U.S. Cl. ...................................................... 361/22
(58) Field of Search ........................................... 361/22

(56) References Cited

U.S. PATENT DOCUMENTS

| | | | |
|---|---|---|---|
| 4,724,503 A * | 2/1988 | Libert ........................ | 361/77 |
| 4,802,053 A * | 1/1989 | Wojtak et al. ................ | 361/85 |
| 4,931,715 A * | 6/1990 | Lee et al. ..................... | 318/709 |
| 5,548,207 A * | 8/1996 | Smith ........................... | 324/86 |
| 5,570,257 A * | 10/1996 | Manning et al. .............. | 361/76 |
| 5,621,296 A * | 4/1997 | Werner et al. ................ | 318/768 |
| 6,020,702 A * | 2/2000 | Farr ............................. | 318/434 |
| 6,147,616 A * | 11/2000 | Kim ............................. | 340/657 |
| 6,564,568 B1 * | 5/2003 | Shen ............................ | 62/230 |

* cited by examiner

*Primary Examiner*—Brian Sircus
*Assistant Examiner*—James A. Demakis
(74) *Attorney, Agent, or Firm*—Greenblum & Bernstein, P.L.C.

(57) ABSTRACT

In an apparatus and a method for detecting a phase state capable of improving reliability of an air conditioner by preventing an abnormal operation of the air conditioner by detecting a phase state (antiphase and open-phase) of three phase AC power supplied to the air conditioner and displaying the detected phase state, the apparatus includes a phase detector for detecting first, second and third phases of a three phase current; an interrupt detector for detecting a falling edge of a pulse signal corresponded to the third phase of the detected first, second and third phases, recognizing an interrupt occurrence by the third phase when the falling edge is detected and generating a counting signal; a counter for counting a pulse signal corresponded to the first and second phases on the basis of the interrupt occurred-third phase according to the counting signal; an antiphase/open-phase detector for detecting a state as a normal connection state, an antiphase state on the basis of a pulse signal corresponded to the first or second phase counted by the counter and detecting an open-phase state on the basis of the interrupt counting times; and a display unit for displaying a message indicating the antiphase state or the open-phase state or the normal connection state on a screen according to a control signal of the antiphase/open-phase detector.

8 Claims, 5 Drawing Sheets

APPARATUS AND METHOD FOR DETECTING PHASE STATE

BACKGROUND OF THE INVENTION

1. Field of the Invention

The present invention relates to an air conditioner, and in particular to an apparatus and a method for detecting a phase state of AC power supplied to a multi air conditioner.

2. Description of the Prior Art

In general, a multi air conditioner consists of one outdoor unit and plural indoor units.

Figure 1:
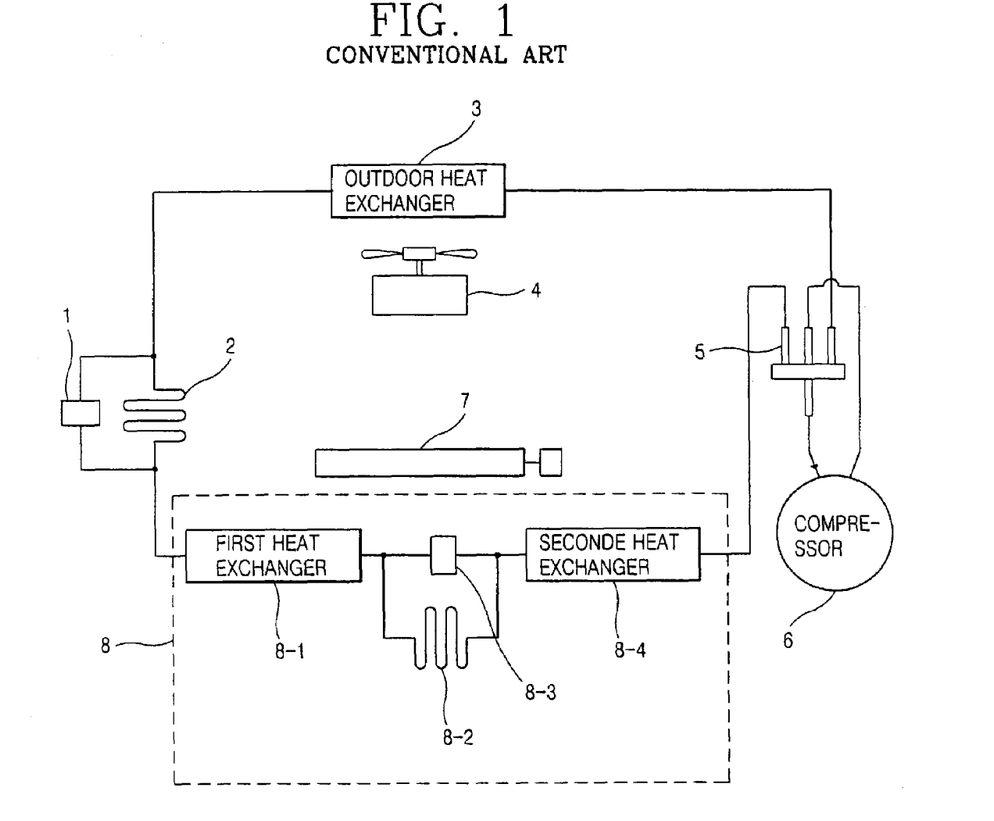
FIG. 1 is a block diagram schematically illustrating a construction of a general air conditioner.

FIG. 1 is a block diagram schematically illustrating a construction of a general air conditioner.

As depicted in FIG. 1, the air conditioner includes a compressor 6 for sucking and compressing low temperature-low pressure refrigerant vapors discharged from an indoor heat exchanger 8 in order to change them into high temperature-high pressure vapors; an outdoor heat exchanger 3 for changing the high temperature-high pressure vapors discharged from the compressor 6 into a high pressure saturated solution; an indoor heat exchanger 8 for converting the high pressure saturated solution discharge from the outdoor heat exchanger 3 into a low temperature-low pressure refrigerant and evaporating it in order to get saturated vapors without having a liquid element; a four way valve 5 for adjusting flow of the refrigerant according to a heating or a cooling model and a two way valve 1 for discharging a high pressure refrigerant into the indoor heat exchanger 8 in a dehydration mode.

The indoor heat exchanger 8 includes a first heat exchanger 8-1 for sucking a high pressure liquid and gas mixture refrigerant and discharging a high pressure liquid by emitting heat included in the sucked refrigerant in the dehydration mode; an expander 8-2 for making the high pressure liquid discharged from the first heat exchanger 8-1 as a lower pressure liquid; a second heat exchanger 8-4 for sucking the lower pressure liquid and gas mixture refrigerant through the expander 8-2, evaporating it and discharging a low temperature-low pressure refrigerant having no liquid element; and a two way valve 8-3 for cutting off the high pressure liquid discharged from the first heat exchanger 8-1 in order to prevent the high pressure liquid discharged from the first heat exchanger 8-1 from being directly discharged to the second heat exchanger 8-4 in the dehydration mode.

First, in the heating mode, the high temperature-high pressure refrigerant compressed in the compressor 6 is sucked into the indoor heat exchanger 8 through the four way valve 5, is condensed and is converted into a low temperature-low pressure refrigerant through the expander 2. Herein, indoor air sucked through an indoor fan 7 is heat-exchanged while passing the surface of the indoor heat exchanger 8, warm air is discharged into the indoor, and accordingly a temperature in the room rises. Herein, the indoor heat exchanger 8 opens the two way valve 8-3 between the first and second heat exchangers 8-1, 8-4 and makes the indoor heat exchanger 8 operate as a condenser (not shown).

Afterward, the outdoor h eat exchanger 3 sucks the low temperature-low pressure refrigerant, evaporates it and discharge a gas state refrigerant, the compressor 6 sucks the gas state refrigerant discharge from the outdoor heat exchanger 8 and compresses it as a high temperature-high pressure refrigerant, the above-mentioned operation is performed repeatedly in the heating operation.

In the meantime, in the cooling mode, the high temperature-high pressure refrigerant compressed in the compressor 6 passes through the four way valve 5, is sucked into, is condensed in the outdoor heat exchanger 3 and is converted into a low temperature-low pressure refrigerant through the expander 2.

The indoor heat exchanger 8 sucks the low temperature-low pressure refrigerant, evaporates it and discharges a gas state refrigerant, the compressor 6 sucks the gas state refrigerant discharged from the indoor heat exchanger 8 and compresses it as a high temperature-high pressure refrigerant. Herein, the indoor heat exchanger 8 opens the two way valve 8-3 between the first and second heat exchangers 801, 8-4 and makes the indoor heat exchanger 8 operate as the evaporator.

Herein, the indoor air sucked through the indoor fan 7 is heat-exchanged while passing the cooled surface of the indoor heat exchanger 8, cold air is discharged into the indoor, and accordingly a temperature in the room falls.

In the meantime, in the dehydration mode, the high temperature-high pressure refrigerant compressed by the compressor 6 is sucked into the outdoor heat exchanger 3 through the four way valve 5. Herein, an outdoor fan 4 rotates at a low speed, the high temperature-high pressure refrigerant passes through the two way valve 1 without being cooled almost and is sucked into the indoor heat exchanger 8 directly.

Afterward, the first heat exchanger 8-1 emits heat by sucking high pressure liquid and gas mixed cold air and discharge the high pressure liquid, the second heat exchanger 8-4 sucks the high pressure liquid discharged from the first heat exchanger 8-1 as a low pressure liquid through the expander 8-2, evaporates it and discharges a high temperature-high pressure refrigerant having no liquid element. Herein, the indoor air sucked through the indoor fan 7 is heat-exchanged while passing the cooled surface of the second heat exchanger 8-4, moisture is removed, the dried air is heated while passing the heated surface of the first heat exchanger 8-1 and is discharged into the indoor. Herein, the indoor fan 7 is installed at the indoor heat heat exchanger 8, and the outdoor fan 4 is installed at the outdoor heat exchanger 3.

However, in the conventional art, after installing the air conditioner at a pertinent position, in order to operate the air conditioner, when three phase Ac power is supplied to the air conditioner, by connecting a terminal of the three phase AC power with a power terminal of the air conditioner abnormally, the compressor 6 of the air conditioner is operated abnormally. In more detail, an installer may not classify a R phase terminal, a S phase terminal and a T phase terminal of the three phase AC power terminal accurately and may connect the three phase AC power terminal with the power terminal of the air conditioner abnormally, and accordingly antiphase (opposite phase) or open-phase occurs.

In addition, by connecting a terminal of the three phase AC power with a power terminal of the air conditioner abnormally, when antiphase (opposite phase) or open-phase occurs, a control unit of the air conditioner is damaged, and accordingly it can not be operated.

As described above, in the conventional art, an installer can not classify a R phase terminal, a S phase terminal and a T phase terminal of the three phase AC power terminal accurately.

In addition, in the conventional art, when the installer supplies three phase AC power to the air conditioner, by connecting a terminal of the three phase AC power with a power terminal of the air conditioner abnormally, the compressor of the air conditioner is operated abnormally.

In addition, in the conventional art, when the installer connects the three phase AC power terminal with the power terminal of the air conditioner abnormally, antiphase (opposite phase) or open-phase occurs, a control unit of the air conditioner is damaged, and accordingly it can not be operated.

SUMMARY OF THE INVENTION

In order to solve the above-mentioned problems, it is an object of the present invention to provide an apparatus and a method for detecting a phase state capable of improving reliability of an air conditioner by preventing an abnormal operation of the air conditioner by supplying three phase AC power accurately to the air conditioner.

It is another object of the present invention to provide an apparatus and a method for detecting a phase state capable of improving reliability of an air conditioner by preventing an abnormal operation of the air conditioner by detecting a phase state (antiphase and open-phase) of three phase AC power supplied to the air conditioner and displaying the detected phase state.

In order to achieve the above-mentioned objects, an antiphase/open-phase detecting apparatus for an air conditioner in accordance with the present invention includes a phase detector for detecting first, second and third phases of a three phase current; an interrupt detector for detecting a falling edge of a pulse signal corresponded to the third phase of the detected first, second and third phases, recognizing an interrupt occurrence by the third phase when the failing edge is detected and generating a counting signal; a counter for counting a pulse signal corresponded to the first and second phases on the basis of the interrupt occurred-third phase according to the counting signal; an antiphase/open-phase detector for detecting a state as a normal connection state, an antiphase state on the basis of a pulse signal corresponded to the first or second phase counted by the counter and detecting an open-phase state on the basis of the number of interrupt counting times; and a display unit for displaying a message indicating the antiphase state or the open-phase state or the normal connection state on a screen according to a control signal of the antiphase/open-phase detector.

In order to achieve the above-mentioned objects, an antiphase/open-phase detecting method for an air conditioner in accordance with the present invention includes detecting first, second and third phases of a third phase AC current; detecting a falling edge of a pulse signal corresponded to the third phase of the first, second and third phases and recognizing an interrupt occurrence when the falling edge is detected; reading a pulse corresponded to the first and second phases when the interrupt occurs by the third phase; judging a state as a normal connection state, an antiphase state on the basis of a pulse signal corresponded to the first or second phase counted by the counter on the basis of the interrupt-occurred third phase and judging an open-phase state on the basis of the number of interrupt counting times; and displaying a message indicating the antiphase or open-phase or normal connection state on a screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Hereinafter, the preferred embodiments of an antiphase/open-phase detecting apparatus for an air conditioner and a method thereof in accordance with the present invention capable of preventing an abnormal operation of an air conditioner and improving reliability of the air conditioner by detecting a phase state (antiphase or open-phase) of three phase AC power supplied to the air conditioner, displaying the detected phase state on a screen and supplying the three phase AC power to the air conditioner accurately will be described in detail with reference to accompanying FIGS. 2, 3, 4A and 4B.

Figure 2:
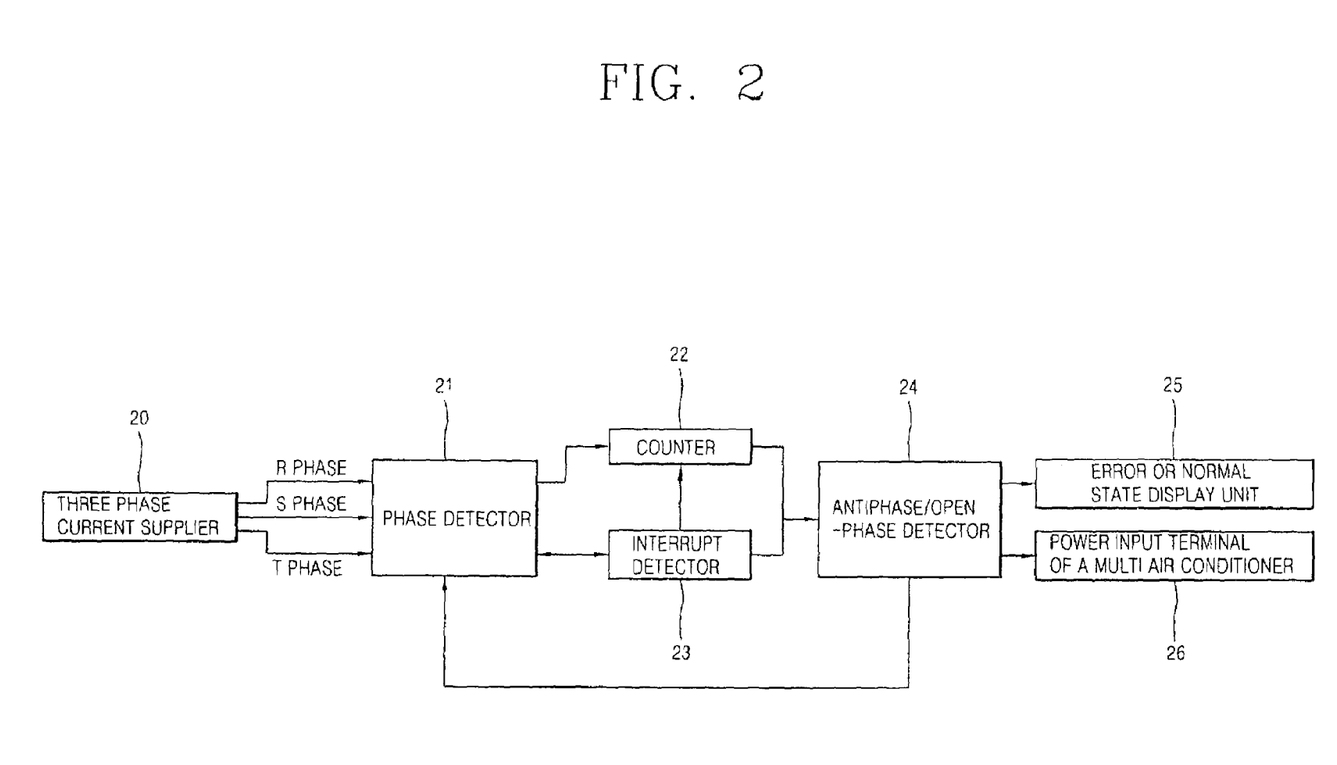
FIG. 2 is a block diagram illustrating an antiphase/open-phase detecting apparatus for an air conditioner in accordance with the present invention.

FIG. 2 is a block diagram illustrating an antiphase/open-phase detecting apparatus for an air conditioner in accordance with the present invention.

As depicted in FIG. 2, the antiphase/open-phase detecting apparatus includes a phase detector 21 for detecting a R phase (first phase), a S phase (second phase) and a T phase (third phase) of a three phase current outputted from a three phase current power supplier 20 or cutting off the three phase current outputted from the three phase current supplier 20 in order to stop operation of all units of the multi air conditioner according to a cut-off signal; an interrupt detector 23 for detecting a falling edge of a pulse signal corresponded to any one of the detected R, S, T phases (for example, T phase), recognizing an interrupt occurrence by the third phase (T phase) and generating a counting signal; a counter 22 for counting a pulse signal corresponded to the first and second phases (R and S phases) on the basis of the interrupt occurred-third phase (T phase) according to the counting signal; an antiphase/open-phase detector 24 for judging a state as a normal connection state when the pulse signal corresponded to the first or second phase (R or S phase) counted by the counter 22 is inputted greater than a predetermined number of times (for example, ten times) in the order of high and low, judging a state as an antiphase state when the pulse signal of the first or second phase (R or S phase) is inputted greater than the predetermined number of times (for example, ten times) in the order of low and high or in the order of high and high, judging a state as an open-phase state when the number of interrupt counting times is less than the predetermined number of times (for example, ten times) and generating the cut-off signal in the antiphase or open-phase state; and a normal state display unit 25 for displaying an antiphase/open-phase error message for indicating the antiphase or open-phase state on a screen according to a display signal of the antiphase/open-phase detector 24 or displaying a normal message for indicating the normal connection state on the screen.

Herein, the three phase current includes three single phase alternating currents (R phase, S phase, T phase), the three phase currents have the same voltage, frequency and amplitude, and they have a phase difference as 120° from each other. The normal connection means a state in which a terminal of the three phase current is connected to a power input terminal 26 of the multi air conditioner normally. The antiphase state means a state in which the terminal of the three phase current is abnormally connected with the power terminal 26 of the multi air conditioner, namely, the R phase terminal, the S phase terminal and the T phase terminal of the three phase current are changed-connected with the power terminal 26 of the multi air conditioner. The open-phase state means a state in which at least one of the three phase current terminals is not connected to the power terminal 26 of the multi air conditioner, the three phase current is not supplied to the multi air conditioner (for example, connection poor).

Hereinafter, the interrupt processing process will be described in detail with reference to accompanying FIG. 3.

Figure 3:
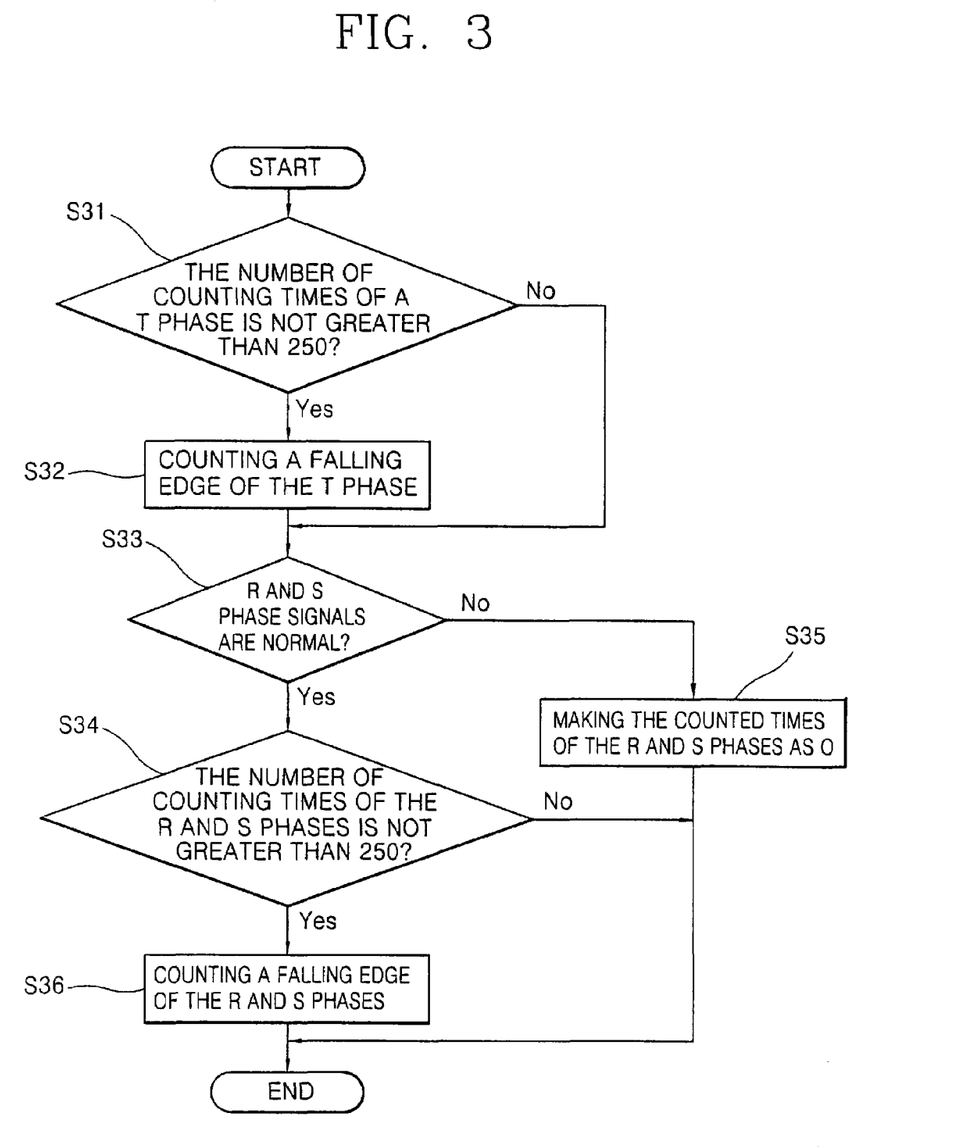
FIG. 3 is a flow chart illustrating an interrupt processing process.

FIG. 3 is a flow chart illustrating an interrupt processing process.

First, the phase detector 21 respectively detects the R, S, T phases of the three phase current, the interrupt detector 23 detects a falling edge of a pulse signal corresponded to any one (for example, T phase) of the detected R, S, T phases, when the falling edge is detected as one time, the interrupt detector 23 recognizes the interrupt occurs as one time and outputs a counting signal to the counter 22.

The counter 22 counts the falling edge of the pulse signal corresponded to the T phase on the basis of the counting signal outputted from the interrupt detector 23. When the number of counting times is not greater than '250' as shown at step S31, the antiphase/open-phase detector 24 sequentially counts the falling edge of the T phase through the counter 22. In more detail, whenever the falling edge of the pulse signal of the T phase occurs as one time, the counter 22 increases the number of counting times as one until it reaches '250' as shown at step S32.

In the meantime, when the input signal of the R and S phases is abnormal (namely, when the pulse signal of the R phase is 'high' and the pulse signal of the S phase is not 'low'), the number of counting times by the counter 22 is 0, the input signal of the R and S phases is normal (namely, when the pulse signal of the R phase is 'high' and the pulse signal of the S phase is 'low'), it is judged whether the number of counting times is not greater than '250', when it is not greater than '250', the falling edge of the R and S phases is sequentially counted. In more detail, whenever the falling edge of the R and T phases occurs as one time, the counter 22 increases the number of counting times as one until it reaches '250' as shown at steps S33~S35.

Figure 4A:
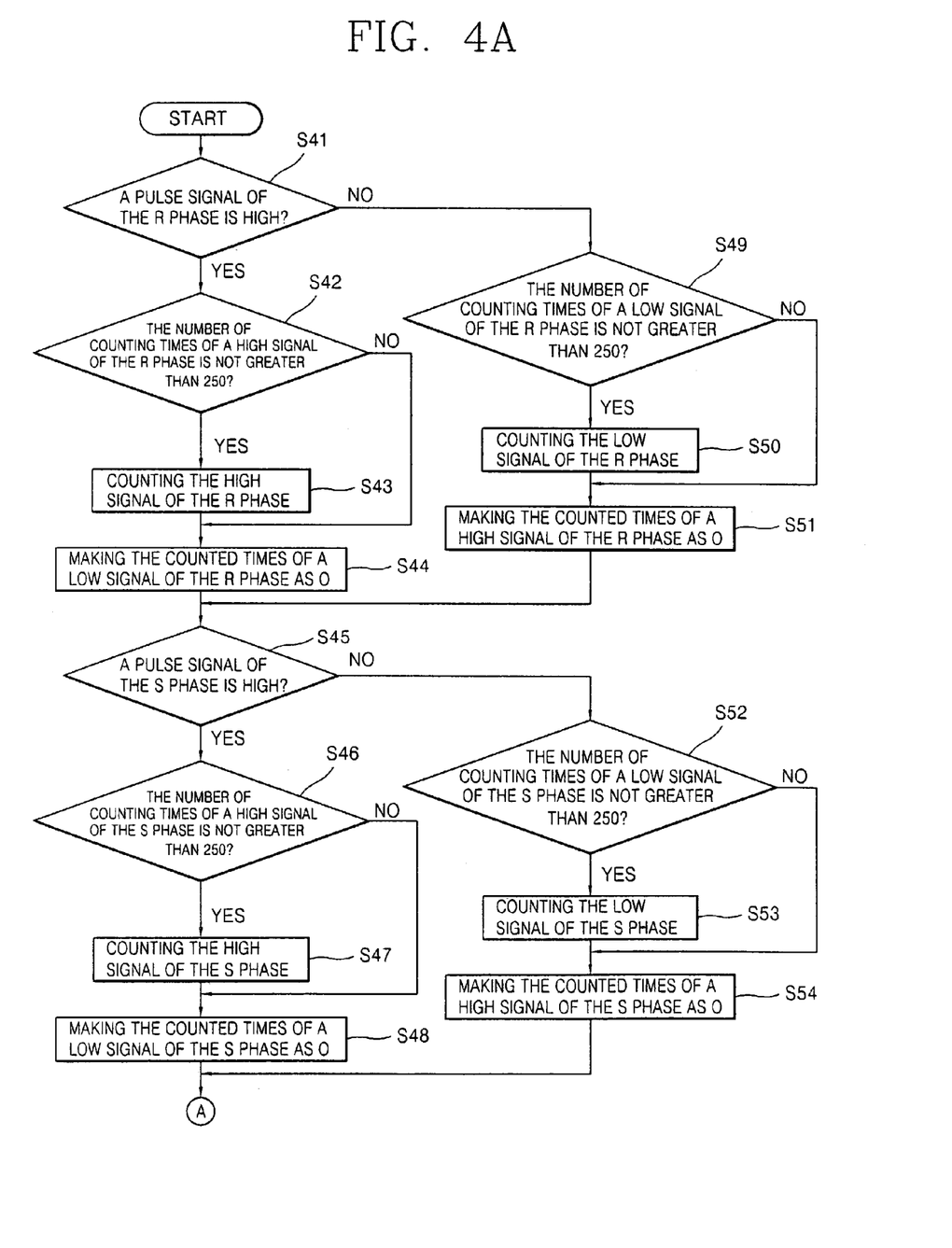
FIGS. 4A and 4B are flow charts illustrating an antiphase/open-phase detecting method of a multi air conditioner in accordance with the present invention.
Figure 4B:
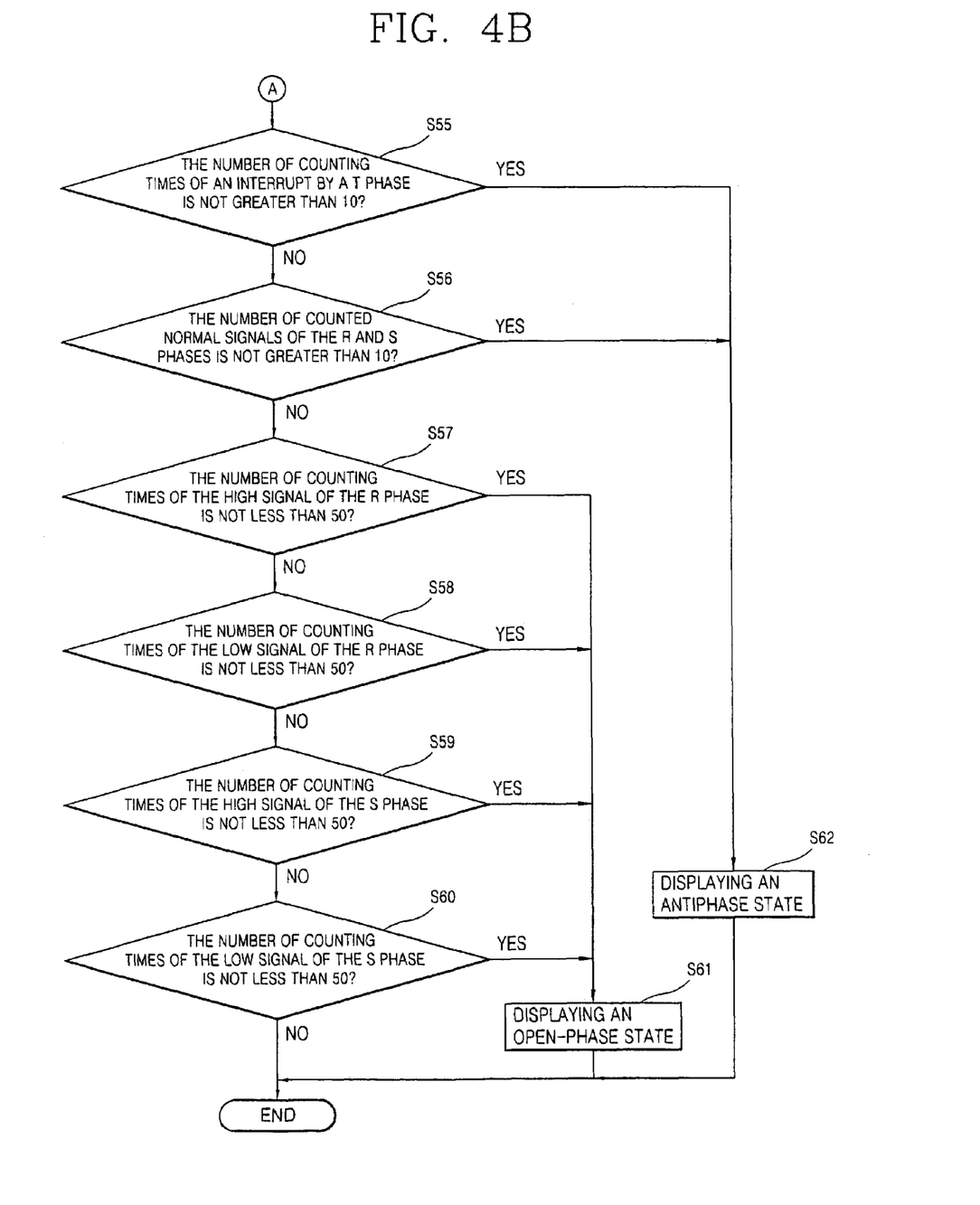

FIGS. 4A and 4B are flow charts illustrating an antiphase/open-phase detecting method of a multi air conditioner in accordance with the present invention.

As depicted in FIGS. 4A~4B, the antiphase/open-phase detecting method includes detecting R, S and T phases (first, second and third phases) of a third phase current; detecting a falling edge of a pulse signal corresponded to any one of the phases (for example, T phase) and recognizing an interrupt occurs as one time when the falling edge is detected as one time; reading a pulse signal corresponded to the first and second phases (R and S phases) when an interrupt occurs by the third phase (T phase); judging a state as the normal connection state when the pulse signal corresponded to the first or second phase (R or S phase) is inputted greater than ten times in the order of high and low (when the pulse signal corresponded to the first or second phase (R or S phase) is inputted greater than ten periods in the order of high and low), judging a state as an antiphase state when the pulse signal of the first or second phase (R or S phase) is inputted greater than ten times in the order of low and high or in the order of high and high; judging a state as an open-phase state when the interrupt counting number is less than ten times; and stopping the operation of the multi air conditioner when it is judged as the antiphase or the open-phase and displaying an antiphase/open-phase error message or a normal message indicating the normal connection state on a screen.

Hereinafter, the antiphase/open-phase detecting method will be described in more detail with reference to accompanying FIGS. 2, 3, 4A and 4B.

First, when an interrupt occurs by the T phase (third phase), the phase detector 21 reads the R and S phases (first and second phases). In more detail, when the pulse signal corresponded to the R phase read by the phase detector 21 is high as shown at step S41 and the high signal counting number of the pulse signal corresponded to the R phase is not greater than '250' as shown at step S42, the antiphase/open-phase detector 24 sequentially counts the high signal of the pulse signal corresponded to the R phase through the counter 22 (increases as one time) as shown at step S43 and makes the number of low signal counting times of the pulse signal corresponded to the R phase as 0. Herein, in order to make the number of low signal counting times of the pulse signal corresponded to the R phase as 0, the antiphase/open-phase detector 24 initializes the counter 22 for counting the low signal of the pulse signal corresponded to the R phase as shown at step S44.

On the other hand, when the pulse signal corresponded to the R phase read by the phase detector 21 is low and the low signal counting number of the pulse signal corresponded to the R phase is not greater than '250' as shown at step S49, the antiphase/open-phase detector 24 sequentially counts the low signal of the pulse signal corresponded to the R phase through the counter 22 (increases as one time) as shown at step S50 and makes the number of high signal counting times of the pulse signal corresponded to the R phase as 0. Herein, in order to make the number of high signal counting times of the pulse signal corresponded to the R phase as 0, the antiphase/open-phase detector 24 initializes the counter 22 for counting the high signal of the pulse signal corresponded to the R phase as shown at step S51.

Afterward, the antiphase/open-phase detector 24 judges whether the pulse signal corresponded to the read S phase is a high signal as shown at step S45.

When the pulse signal corresponded to the S phase is a high signal and the number of high signal counting times of the pulse signal corresponded to the S phase is not greater than '250' as shown at step S46, the antiphase/open-phase detector 24 sequentially counts the high signal of the pulse signal corresponded to the S phase through the counter 22 (increases as one time) as shown at step S47 and makes the number of low signal counting times of the pulse signal corresponded to the S phase as 0. Herein, in order to make the number of low signal counting times of the pulse signal corresponded to the S phase as 0, the antiphase/open-phase detector 24 initializes the counter 22 for counting the low signal of the pulse signal corresponded to the S phase as shown at step S48.

On the other hand, when the pulse signal corresponded to the S phase is low and the number of low signal counting times of the pulse signal corresponded to the S phase is not greater than '250' as shown at step S52, the antiphase/open-phase detector 24 sequentially counts the low signal of the pulse signal corresponded to the S phase through the counter 22 (increases as one time) as shown at step S53 and makes the number of high signal counting times of the pulse signal corresponded to the S phase as 0. Herein, in order to make the number of high signal counting times of the pulse signal corresponded to the S phase as 0, the antiphase/open-phase detector 24 initializes the counter 22 for counting the high signal of the pulse signal corresponded to the S phase as shown at step S54.

Afterward, when the pulse signal of the first or second phase (R or S phase) is inputted greater than ten times in the order of high and low on the basis of the third phase (T phase) at which the interrupt occurs, the antiphase/open-phase detector 24 judges it as the normal connection, when the pulse signal of the first or second phase is inputted in the order of low and high or in the order of high and high, the antiphase/open-phase detector 24 judges it as the antiphase.

In addition, when the number of counting times of the interrupt occurred by the third phase (T phase) is not grater than ten times, the antiphase/open-phase detector 24 judges it as the antiphase as shown at step S55. On the other hand, when the number of counting times of the interrupt is not grater than ten times and the pulse signal of the first or second phase is inputted not greater than tem times in the order of high and low, the antiphase/open-phase detector 24 judges it as the antiphase as shown at step S56. Herein, when the number of counting times of the interrupt counted by the counter 22 is less than ten times, the antiphase/open-phase detector 24 judges it as the open-phase.

In addition, when the number of counting times of the high signal of the pulse signal corresponded to the R phase is not less than fifty times as shown at step S57, the antiphase/open-phase detector 24 judges it as the open-phase as shown at step S57. When the number of counting times of the high signal corresponded to the R phase is not greater than fifty times and the number of counting times of the low signal of the pulse signal corresponded to the R phase is not less than fifty times, the antiphase/open-phase detector 24 judges it as the open-phase as shown at step S58.

When the number of counting times of the high signal of the pulse signal corresponded to the S phase is not less than fifty times, the antiphase/open-phase detector 24 judges it as the open-phase as shown at step S59. When the number of counting times of the high signal of the pulse signal corresponded to the S phase is not less than fifty times and the number of counting times of the low signal of the pulse signal corresponded to the S phase is not less than fifty times, the antiphase/open-phase detector 24 judges it as the open-phase as shown at step S60.

Afterward, when it is judged as the antiphase or the open-phase, the antiphase/open-phase detector 24 outputs a cut-off signal for stopping the operation of the air conditioner to the phase detector 21. Herein, the phase detector 21 cuts off the three phase current outputted from the three phase power supplier 20 on the basis of the cut-off signal. In addition, when it is judged as the antiphase or the open-phase, the antiphase/open-phase detector 24 outputs an indication signal for indicating the antiphase or the open-phase state to the error or normal state display unit 25. Herein, the error or normal state display unit 25 displays the message indicating the antiphase, the open-phase or the normal connection state on the screen on the basis of the indication signal as shown at steps S61 and S62.

In the meantime, the antiphase or the open-phase state can be displayed through a display unit such as a LED. For example, according to the blink times of the LED, the normal connection, the antiphase and the open-phase states can be displayed.

As described above, in the antiphase/open-phase detecting method for the air conditioner in accordance with the present invention, by indicating the antiphase and the open-phase state to the installer in supply of the three phase AC power to the air conditioner, abnormal operation of the multi air conditioner can be prevented, and accordingly it is possible to improve reliability of the air conditioner.

In addition, in the antiphase/open-phase detecting method for the air conditioner in accordance with the present invention, by indicating the antiphase and the open-phase state to the installer in supply of the three phase AC power to the air conditioner, the installer can accurately classify the R, S, T phase terminals of the three phase power terminal, and accordingly it is possible to connect the three phase AC power terminal with the power terminal of the air conditioner normally.

In addition, in the antiphase/open-phase detecting method for the air conditioner in accordance with the present invention, by indicating the antiphase and the open-phase state to the installer through the display unit, it is possible to connect the three phase AC power terminal with the power terminal of the air conditioner normally, and accordingly the compressor of the air conditioner can be operated normally.

In addition, in the antiphase/open-phase detecting method for the air conditioner in accordance with the present invention, by indicating the antiphase/open-phase state to the installer through the display unit, antiphase/open-phase occurrence can be prevented, and accordingly it is possible to prevent damage of the control unit of the air conditioner and operate the air conditioner normally.

What is claimed is:

1. A phase state detecting apparatus, comprising:
   a phase detector for detecting first, second and third phases of a three phase current;
   an interrupt detector for detecting a falling edge of a pulse signal corresponded to the third phase of the detected first, second and third phases, recognizing an interrupt occurrence by the third phase when the failing edge is detected and generating a counting signal;
   a counter for counting a pulse signal corresponded to the first and second phases on the basis of the interrupt occurred-third phase according to the counting signal;
   an antiphase/open-phase detector for detecting a state as a normal connection state, an antiphase state on the basis of a pulse signal corresponded to the first or second phase counted by the counter and detecting an open-phase state on the basis of the interrupt counting times; and
   a display unit for displaying a message indicating the antiphase state or the open-phase state or the normal connection state on a screen according to a control signal of the antiphase/open-phase detector.

2. The apparatus of claim 1, wherein the antiphase/open-phase detector judges a state as the normal connection when a pulse signal corresponded to the first or second phase counted by the counter is inputted not less than a predetermined number of times in the order of high and low; judges a state as the antiphase when the first or second phase is inputted not less than a predetermined number of times in the order of low and high or in the order of high and high; and judges a state as the open-phase when the interrupt counting times is less than a predetermined number of times.

3. The apparatus of claim 1, wherein the phase detector cuts off the three phase current supplied to the air conditioner in order to stop the operation of the all units of the air conditioner in the antiphase or open-phase state.

4. The apparatus of claim 1, wherein the normal connection means a state in which a terminal of the three phase current is connected to a power input terminal of the multi air conditioner normally; the antiphase state means a state in which a R phase terminal, a S phase terminal and a T phase terminal of the three phase current are changed-connected with the power terminal of the multi air conditioner; and the open-phase state means a state in which at least one of the three phase current terminals is not connected to the power terminal of the multi air conditioner and the three phase current is not supplied to the multi air conditioner.

5. A phase state detecting apparatus, comprising:
   a phase detector for detecting first, second and third phases of a three phase AC current outputted or cutting off the inputted three phase AC current in order to stop operation of all units of a multi air conditioner according to a cut-off signal;
   an interrupt detector for detecting a falling edge of a pulse signal corresponded to the third phase of the detected first, second and third phases, recognizing an interrupt occurrence by the third phase when the failing edge is detected and generating a counting signal;
   a counter for counting a pulse signal corresponded to the first and second phases on the basis of the interrupt occurred-third phase according to the counting signal;
   an antiphase/open-phase detector for judging a state as a normal connection state when the pulse signal corresponded to the first or second phase counted by the counter is inputted greater than a predetermined number of times in the order of high and low, judging a state as an antiphase state when the pulse signal of the first or second phase is inputted greater than the predetermined number of times in the order of low and high or in the order of high and high, judging a state as an open-phase state when the number of interrupt counting times is less than the predetermined number of times and generating the cut-off signal in the antiphase or open-phase state; and
   a normal state display unit for displaying an antiphase/open-phase error message for indicating the antiphase or open-phase state on a screen or displaying a normal message for indicating the normal connection state on the screen according to a control signal of the antiphase/open-phase detector.

6. A phase state detecting method, comprising:
   detecting first, second and third phases of a third phase AC current;
   detecting a falling edge of a pulse signal corresponded to the third phase of the first, second and third phases and recognizing an interrupt occurrence when the falling edge is detected;
   reading a pulse corresponded to the first and second phases when the interrupt occurs by the third phase;
   judging a state as a normal connection state, an antiphase state on the basis of a pulse signal corresponded to the first or second phase counted by the counter on the basis of the interrupt-occurred third phase and judging an open-phase state on the basis of the interrupt counting times; and
   displaying a message indicating the antiphase or open-phase or normal connection state on a screen.

7. The method of claim 6, wherein the judging step includes the sub-steps of:
   judging a state as the normal connection when a pulse signal corresponded to the first or second phase counted by the counter is inputted not less than a predetermined number of times in the order of high and low and judging a state as the antiphase when the first or second phase is inputted not less than a predetermined number of times in the order of low and high or in the order of high and high; and
   judging a state as the open-phase when the interrupt counting times is less than a predetermined number of times.

8. A phase state detecting method, comprising:
   detecting first, second and third phases of a third phase AC current;
   detecting a falling edge of a pulse signal corresponded to the third phase of the first, second and third phases and recognizing an interrupt occurrence when the falling edge is detected;
   reading a pulse corresponded to the first and second phases when the interrupt occurs by the third phase;
   judging a state as the normal connection when a pulse signal corresponded to the first or second phase counted by the counter is inputted not less than a predetermined number of times in the order of high and low and judging a state as the antiphase when the first or second phase is inputted not less than a predetermined number of times in the order of low and high or in the order of high and high;
   judging a state as the open-phase when the interrupt counting times is less than a predetermined number of times; and
   displaying an error message indicating the antiphase/open-phase state on a screen after stopping the operation of all units of the multi air conditioner when the antiphase or open-phase is judged or displaying the normal connection state on the screen.

* * * * *